United States Patent
Eberle et al.

(10) Patent No.: US 11,015,555 B2
(45) Date of Patent: May 25, 2021

(54) DELIVERY DEVICE FOR THE FUEL OF AN INTERNAL COMBUSTION ENGINE

(71) Applicant: HYDAC FLUIDCARECENTER GMBH, Sulzbach/Saar (DE)

(72) Inventors: Richard Eberle, Ormesheim (DE); Thomas Scholl, Saarlouis (DE); Jonas Haupenthal, St. Wendel (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 0 days.

(21) Appl. No.: 16/636,717

(22) PCT Filed: Aug. 9, 2018

(86) PCT No.: PCT/EP2018/071643
§ 371 (c)(1),
(2) Date: May 11, 2020

(87) PCT Pub. No.: WO2019/030332
PCT Pub. Date: Feb. 14, 2019

(65) Prior Publication Data
US 2020/0392926 A1    Dec. 17, 2020

(30) Foreign Application Priority Data
Aug. 11, 2017   (DE) .................. 10 2017 007 603.0

(51) Int. Cl.
*F02M 37/32*   (2019.01)
*B60K 15/03*   (2006.01)
(Continued)

(52) U.S. Cl.
CPC ......... *F02M 37/0035* (2013.01); *B60K 15/03* (2013.01); *F02M 37/0017* (2013.01);
(Continued)

(58) Field of Classification Search
CPC ............... F02M 37/0035; F02M 37/32; F02M 37/0017; F02M 37/0029; F02M 37/04; B60K 15/03
(Continued)

(56) References Cited

U.S. PATENT DOCUMENTS

| | | | |
|---|---|---|---|
| 4,187,813 A | 2/1980 | Stumpp | |
| 4,231,342 A * | 11/1980 | Johnston | F02M 53/00 123/513 |

(Continued)

FOREIGN PATENT DOCUMENTS

| | | |
|---|---|---|
| DE | 600 20 731 | 5/2006 |
| DE | 10 2010 041 063 | 3/2012 |

(Continued)

OTHER PUBLICATIONS

International Search Report (ISR) dated Oct. 11, 2018 in International (PCT) Application No. PCT/EP2018/071643.

*Primary Examiner* — Mahmoud Gimie
(74) *Attorney, Agent, or Firm* — Wenderoth, Lind & Ponack, L.L.P.

(57) ABSTRACT

A delivery device for the fuel of an internal combustion engine has a fuel tank (4) from which at least one fuel pump (14, 18) delivers fuel via a fuel supply line (10) and via at least one fuel filter (12, 16) to a fuel consumer (2). The consumer (2) is connected to the fuel tank (4) via a fuel return line (20). A control device (24) is connected between the supply line (10) and the return line (20). The control device establishes a fuel-conveying connection (80) between the return line (20) and the supply line (10) when the temperature in the fuel tank (4) falls below a predeterminable threshold temperature and at a predeterminable threshold pressure in the return line (20).

14 Claims, 3 Drawing Sheets

(51) Int. Cl.
*F02M 37/04* (2006.01)
*F02M 37/00* (2006.01)
(52) U.S. Cl.
CPC ........ *F02M 37/0029* (2013.01); *F02M 37/04* (2013.01); *F02M 37/32* (2019.01)
(58) Field of Classification Search
USPC ................................................ 123/445, 514
See application file for complete search history.

(56) References Cited

U.S. PATENT DOCUMENTS

| | | | | |
|---|---|---|---|---|
| 4,446,839 A | * | 5/1984 | Sekiguchi | F02D 41/005 123/568.28 |
| 4,574,762 A | | 3/1986 | Muller et al. | |
| 2003/0150783 A1 | | 8/2003 | Roesgen | |
| 2007/0175807 A1 | | 8/2007 | Roesgen | |
| 2012/0204833 A1 | * | 8/2012 | Yonemoto | F02M 37/40 123/446 |

FOREIGN PATENT DOCUMENTS

| | | |
|---|---|---|
| DE | 10 2011 009 035 | 7/2012 |
| EP | 3 088 722 | 11/2016 |
| FR | 2 891 023 | 3/2007 |
| JP | 2012-167559 | 9/2012 |
| WO | 02/01061 | 1/2002 |

\* cited by examiner

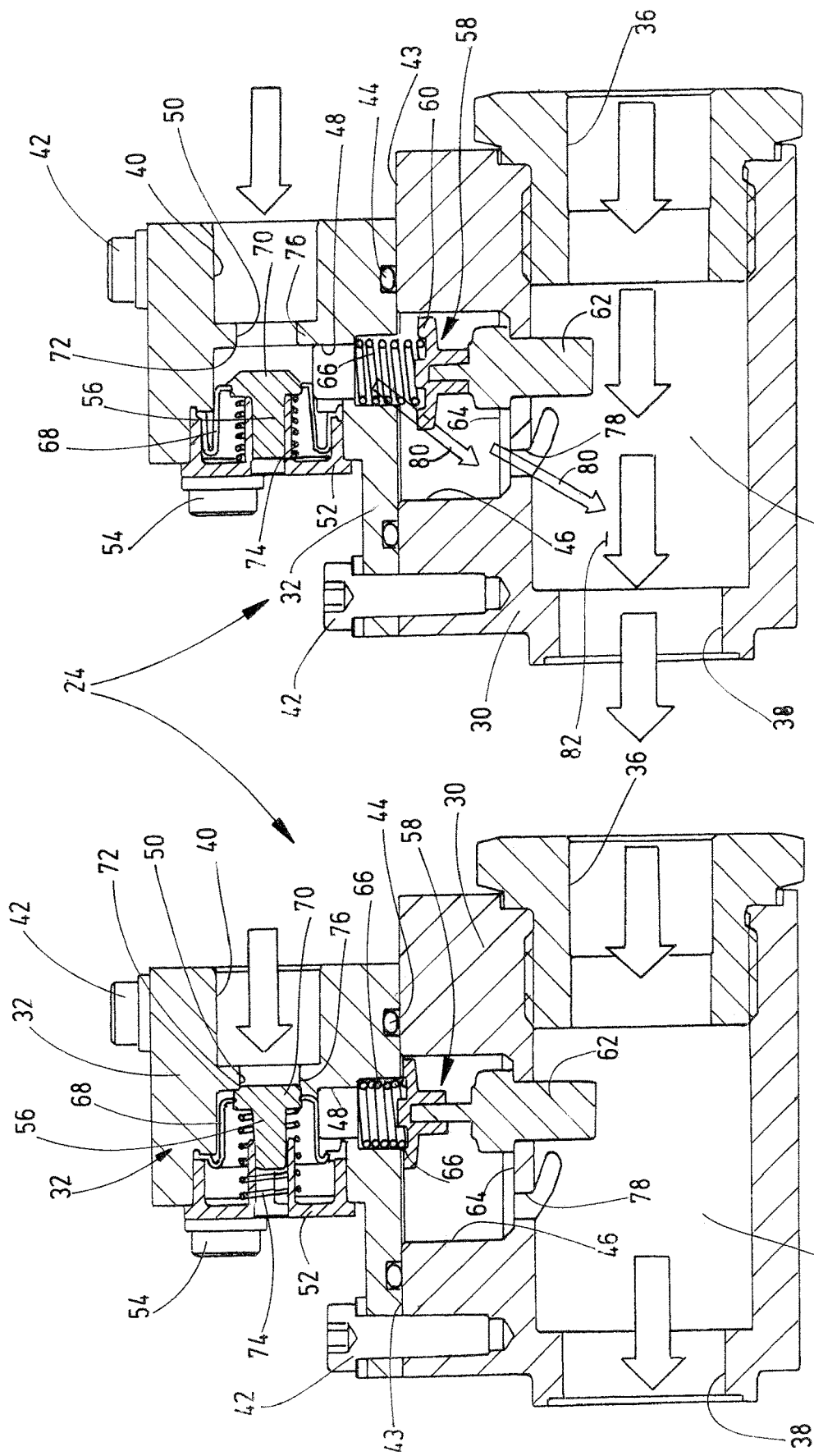

DELIVERY DEVICE FOR THE FUEL OF AN INTERNAL COMBUSTION ENGINE

FIELD OF THE INVENTION

The invention relates to a delivery device for the fuel to an internal combustion engine, having a fuel tank. From the fuel tank, at least one fuel pump delivers fuel via a fuel supply line and via at least one fuel filter to a fuel consumer. The fuel consumer is connected to the fuel tank via a fuel return line. Furthermore, the invention relates to a control device, which is provided in particular for the operation of such a delivery device.

BACKGROUND OF THE INVENTION

Pressure-controlled or stroke-controlled fuel injection devices can be used for the fuel supply of combustion chambers, in particular of self-igniting internal combustion engines such as diesel engines. The fuel injection devices used are unit-injector devices or unit-pump devices, such as common rail systems. Such common-rail injection systems can be used to adapt the injection pressure to the relevant load and the speed of the assigned internal combustion engine. To achieve high specific outputs of such internal combustion engines and to minimize emissions, the aim is to achieve the highest possible injection pressure. The fuel for such fuel injection devices is delivered by fuel delivery devices from a fuel tank by a fuel pump via a fuel line to a high-pressure fuel source, usually a high-pressure fuel pump in a manner known per se. The high-pressure fuel source may also be a pressure booster. In common-rail injection systems, the high-pressure fuel source in turn acts on a high-pressure fuel line or high-pressure distributor rail, to which a number of fuel injectors are fluidically connected at least matching the number of combustion chambers to be supplied with fuel. The fuel injectors also each have a fuel return line, which is routed to the fuel tank via a return line.

DE 10 2011 009 035 A1 shows a delivery device of the type mentioned above. Because such fuel injection devices having common-rail lines have very small throttle and/or valve opening cross-sections, the fuel must be filtered to ensure a proper long-term functioning of the fuel injectors. When operating the delivery devices at very low temperatures, there is a risk of disruptions of the proper functioning of the filter devices used, in particular for fuels that are not absolutely free from water.

SUMMARY OF THE INVENTION

With regard to this difficulty, the invention addresses the problem of providing an improved delivery device of the type mentioned at the beginning, which is characterized by a higher operational reliability during operation at low temperatures.

According to the invention, this object is basically achieved by a delivery device having, as an essential special feature of the invention, a control device connected between the supply line and the return line. The control device establishes a fuel-conveying connection between the supply line and the return line when the temperature in the fuel tank and/or in the supply line falls below a predeterminable threshold temperature and at a predeterminable threshold pressure in the return line. In this way, during operation at low temperatures, heated fuel from the return line reaches the volume flow in the supply line towards the downstream filter as additional volume. The heating of the volume flow effected by the heat input from the additional quantity permits the fuel filter to operate properly at low temperature conditions.

Advantageously, the control device can be arranged in such a way that it opens into the supply line upstream of a fuel filter, viewed in the direction of fuel flow, and is connected to the return line upstream of a counterbalance valve, which is connected to the fuel tank on the outlet side.

In particularly advantageous exemplary embodiments of the control device, a thermostatic valve is used for presetting the threshold temperature, and a pressure valve is provided for presetting the threshold pressure. Advantageously, the pressure valve is set to an opening pressure, which is lower than the preload pressure formed by the counterbalance valve. At low temperature and consequently opened thermostatic valve, fuel from the return line, which does not drain into the tank, is then available for the fluid connection via the control device.

The delivery device is designed with particular advantage for an injection system, in which the fuel consumer is formed by the fuel injectors of a diesel combustion engine.

The arrangement can be such that a pre-filter or a main filter is connected upstream and downstream of a delivery pump in the supply line. The pre-filter can advantageously be equipped with a coalescer for water separation.

The subject matter of the invention is also a control device, which is provided in particular for a delivery device according to the invention. Accordingly, the control device comprises a housing having a continuous fluid duct between two ports. The fluid duct forms the initial part of the fuel supply line of the associated delivery device, i.e. the line area between the fuel tank and a filter, in particular a pre-filter. A further, third port forms the inlet of a connecting path to the fluid duct, wherein a thermostatic valve and a pressure valve are located in this connecting path.

In advantageous exemplary embodiments, the thermostatic valve has a spring-loaded thermostatic element. Below a predeterminable threshold temperature, the element is supported by the spring force, shortens and opens and otherwise blocks a fluid path between the pressure valve and the fluid duct between the two ports.

In particularly advantageous exemplary embodiments, the pressure valve is a spring-loaded diaphragm valve having a rolling diaphragm, which opens at a predeterminable threshold pressure at the third port and opens a fluid path from this third port to the thermostatic valve located in the connecting path.

With regard to the design of the thermostatic valve, the arrangement can be advantageously made in such a way that a valve disk is arranged between the thermostatic element and an associated compression spring to maintain the spring force. The disk blocks the fluid path between the pressure valve and the fluid duct in the closed position of the thermostatic valve, and in its open position releases it.

With regard to the design of the housing, the arrangement can be advantageously made in such a way that the fluid path extends perpendicular to the direction of the fluid duct, that the housing is designed to be multipart, in particular bipartite, and that one housing part holds the thermostatic valve having the fluid duct, and the two ports and the other housing part holds the pressure valve having the third port.

If the control device is assigned to a fuel feed device, the two first ports can be connected to the fluid duct and the third port can be connected to the return line of the fuel delivery device.

Advantageously, the control device can be designed as an attachment for a diesel filter device, in particular as an attachment to a pre-filter, which is arranged in the fuel supply line between the tank and the feed pump.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

FIG. 4 is a side view in section of the exemplary embodiment of the control device, in an operating condition at a temperature above a threshold value is shown; and FIG. 5 is a side view in section corresponding to FIG. 4, wherein of the exemplary embodiment, in an operating condition at a temperature below a threshold value and a pressure in a fuel return line above a threshold value.

DETAILED DESCRIPTION OF THE INVENTION

Figure 1:
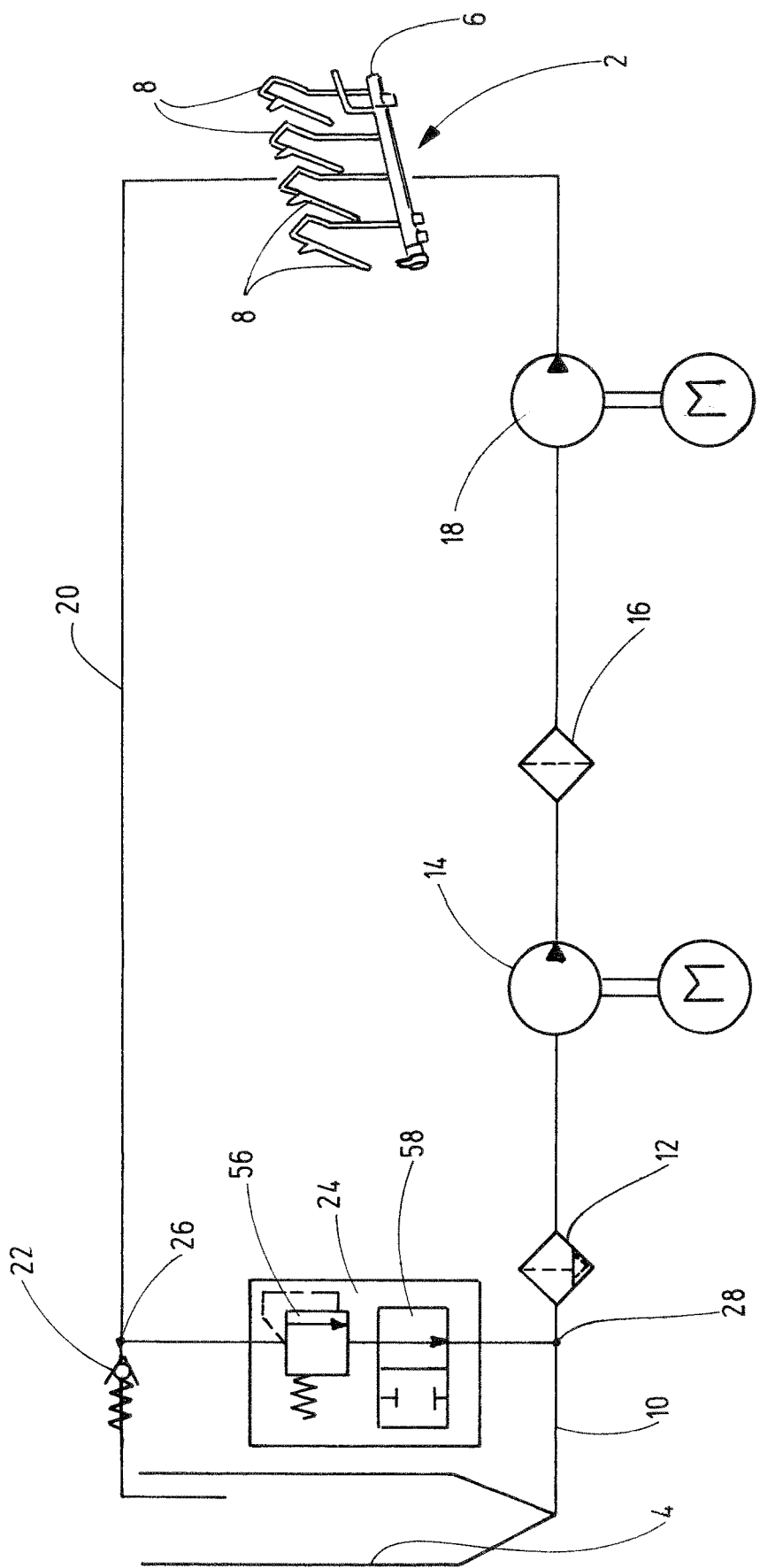
FIG. 1 a schematic circuit diagram of a delivery device according to an exemplary embodiment of the invention.

The exemplary embodiment of the delivery device according to the invention shown in FIG. 1 is intended to supply the fuel injection system 2 of a diesel internal combustion engine with diesel fuel from a tank 4. In the example shown, the injection system 2 is designed as a common rail system (CR). Such common rail systems permit the adaptation of the injection pressure of fuel into the relevant combustion chambers of the internal combustion engine to the load and speeds of the internal combustion engine in an advantageous manner. The figure shows the fuel injection system 2 or the common rail system in simplified form having a high-pressure distributor rail 6, to which the four fuel injectors 8 are fluidically connected. A fuel pre-filter 12, a low-pressure feed pump 14, a main filter 16 and a high-pressure source 18 are inserted in a supply line 10, supply line 10 extends up to the distributor rail 6 of the injection system 2 and is connected to the base of fuel tank 4, viewed in the direction of delivery. A return line 20 is connected to the low-pressure side of the injection system 2, for removing leakage. The return line opens into the tank 4 via a non-return or check valve 22. The check valve 22 is preloaded in such a way that it opens into the tank 4 at a low preload pressure existing in the return line 20.

A control device or control 24 is inserted between a point 26 located in the return line 20 between the return valve 22 and the injection system 2, and a point 28 located in the supply line 10 between the tank 4 and the pre-filter 12. Under certain operating conditions, control device 24 provides a fluid connection path between the return line 20 and the supply line 10. The further figures, in particular FIGS. 4 and 5, show the details of the control device 24, of which FIG. 1 shows solely a symbolic representation. The control device 24 has a bipartite housing having a housing base part or main part 30 and a housing cover 32. The main part 30 has a rectilinear continuous internal fluid duct 34, extending horizontally in the figures, between a first port 36 on the input side and a second port 38 on the output side. When integrated into the delivery device according to the invention, the fluid duct 34 forms a line section of the supply line 10 at the point marked 28. Accordingly, the first port 36 is connected to the tank 4 and the second port 38 to the pre-filter 12 in fluid communication.

A third port 40, which is connected to the return line 20 at the point marked 26 in FIG. 1, i.e. between the non-return valve 22 and the injection system 2, is located on the housing cover 32. Bolts 42 are used to bolt the housing cover 32 to the flat upper surface 43 of the housing main part 30. A sealing element 44 is arranged between the main part 30 and the attachment 32 in such a manner that it encompasses a circular cylindrical recess 46. Recess 46 extends downwardsly from the flat upper surface 43 of the main part 30. A passage 48 formed in the housing cover 32 is also circular cylindrical, but has a smaller diameter than the recess 46, and opens into this recess 46. The upper end of the passage 48 extends in a vertical direction and opens into a horizontal inlet channel 50, which forms the horizontal extension of the inlet of the third port 40. On the side opposite from the third port 40, a housing insert 52, which is attached using bolts 54, forms the closure of the input channel 50.

The housing insert 52 not only forms the closing part, which closes the inlet channel 50 of the housing insert 52 to the outside on the side facing away from the third port 40, but also contains a pressure valve 56. Pressure valve 56 controls the passage of fluid between the inlet channel 50 and the passage 48, which passage of fluid is routed from the housing cover 32 to the recess 46 in the housing main part 30. A thermostatic valve 58 has a movable closing body 60 located inside the recess 46. Closing body 60 closes the mouth of the passage 48 in the closing position shown in FIG. 4 to control the fluid connection between the mouth of the passage 48 and the interior of the recess 46 in the main body 30. A thermostatic element 62 is provided for controlling the closing body 60. The thermostatic element 62 is arranged at the bottom 64 of the recess 46 in such a way that most of its length extends through the bottom 64 into the fluid duct 34. In operation, the fuel flowing in via the first port 36 and originating from tank 4 flows around the thermostatic element, and thus, responds to its temperature. The thermostatic element 62 is preloaded by a compression spring 66 in such a way that it holds the closing element 60 in the open position shown in FIG. 5 if the temperature is below a threshold temperature. When the temperature is above the threshold temperature, the thermostatic element 62 expands accordingly, and the closing element 60 moves into the closed position shown in FIG. 4.

The pressure valve 56 is a diaphragm valve having a rolling diaphragm 68, which is shown in the extended position in FIG. 4 and in the retracted position in FIG. 5. In the extended position (FIG. 4), a closing part 70 of the rolling diaphragm 68 is in tight contact with a sealing edge 72, which is located on a ledge 76 of the inlet channel 50, effectively closing the channel 50. A spring 74 is used to preload the rolling diaphragm 68 having the closing part 70 into the closed position shown in FIG. 4. According to the effect of the spring 74, the pressure valve 56 is set to an opening pressure existing at the port 40, which is below the opening pressure of the check valve 22, but above the pressure existing at the first port 36, and thus, in tank 4.

The thermostatic valve 58 is designed in such a way that the thermostatic element 62, at a predeterminable temperature existing in the fluid duct 34, and thus, in the tank 4, presses the closing element 60 against the force of the spring 66 into the closing position shown in FIG. 4. At comparatively lower temperatures, the spring 66 then moves the closing element 60 into the open position shown in FIG. 5.

The relevant temperature ranges of the thermostatic element can vary depending on the customer or the specific task. In the operating condition shown in FIG. 5, where the pressure valve 56 is opened by the pressure acting in the return flow line 20 via the third port 40, a connecting path is formed via the passage 48, the opened thermostat valve 58 and an opening 78 located in the base 64 of the recess 46. As indicated by flow arrows 80, heated leakage fluid from the return flow line 20 then reaches the fluid duct 34 as an additional quantity to the volume flow in the fluid duct 34. At the slight overpressure in relation to the tank pressure corresponding to the opening pressure of the pressure valve 56, the additional quantity is fed into a mixing zone 82 in FIG. 5, in which the heat input of the additional quantity causes the volume flow reaching the pre-filter 12 via port 38 to warm up.

In particular the pressure valve 56 prevents a suction pressure from developing in the return flow line. This prevention of suction pressure is to protect the high-pressure pump. Furthermore, the pressure valve 56 is preferably designed in such a way that one side is open to the atmosphere (ambiance), permitting pressure compensation. A pressure compensation element can be used to protect the rolling diaphragm 68 from dirt carried in from the outside.

Figure 3:
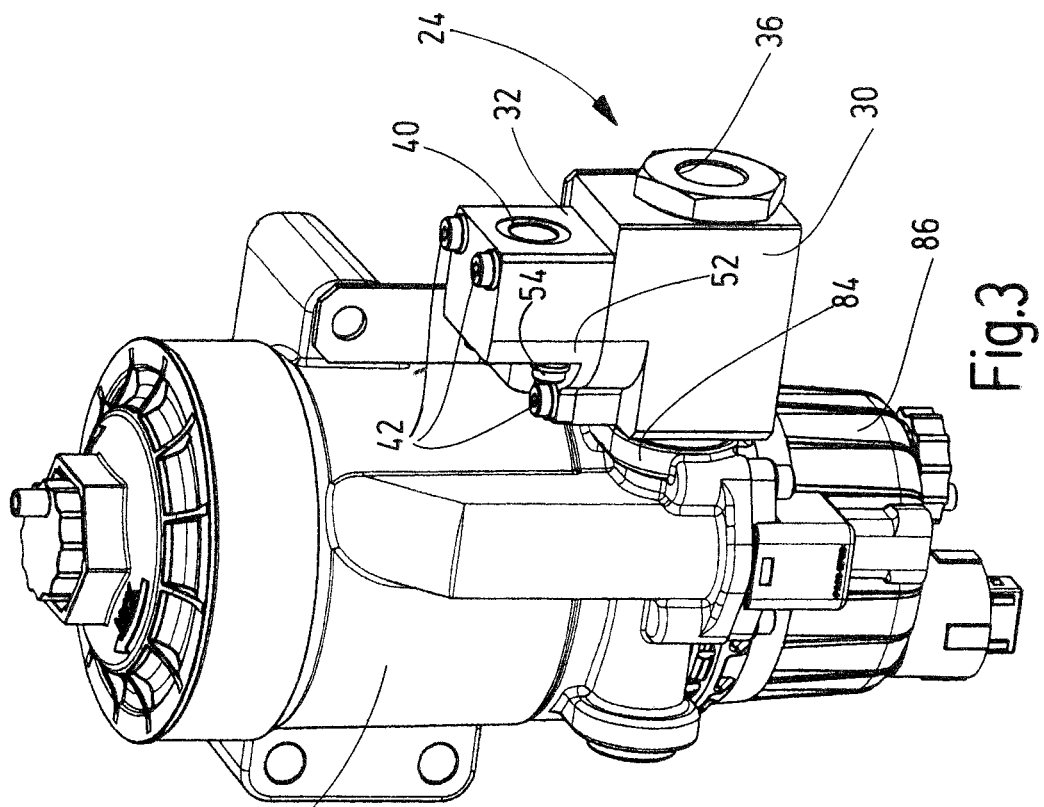
FIG. 3 is a perspective oblique view of the pre-filter of FIG. 2, having an attached control device.
Figure 2:
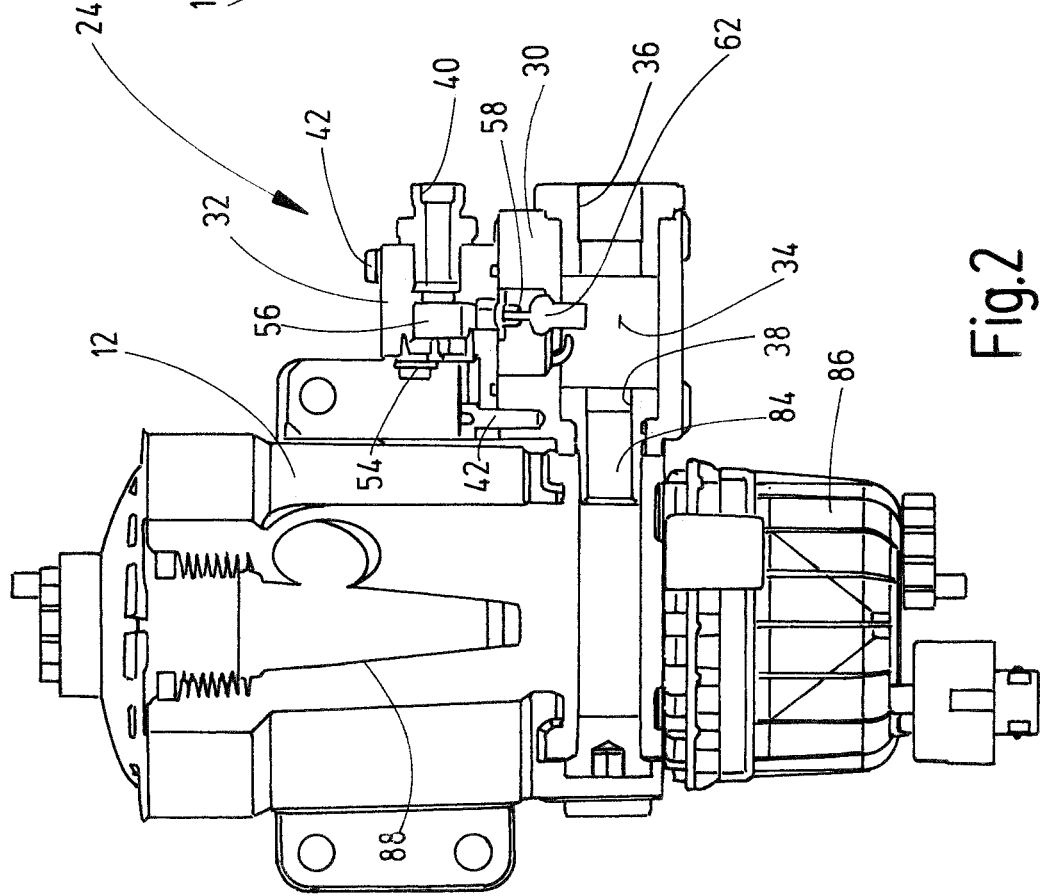
FIG. 2 is a side view, partly cut-away of a fuel pre-filter of the delivery device according to the invention having an attached control device according to the invention, drawn in schematic longitudinal section.

As shown in FIGS. 2 and 3, the control unit 24 has the form of a unit of the main housing part 30, the housing cover 32 and the housing insert 52, and is mounted directly on the fluid inlet 84 of the pre-filter 12. In the advantageous exemplary embodiment shown, the filter medium 88 of the pre-filter has a coalescence layer, which causes separation if the fuel is not completely anhydrous. Separated water drips into a collecting chamber 86 located in the bottom area of the filter housing of pre-filter 12.

While one embodiment has been chosen to illustrate the invention, it will be understood by those skilled in the art that various changes and modifications can be made therein without departing from the scope of the invention as defined in the appended claims.

The invention claimed is:

1. A delivery device for providing fuel to an internal combustion engine, the delivery device comprising:
    a fuel tank;
    a first fuel pump being connected in fluid communication via fuel supply line to the fuel tank and being connectable in fluid communication to the internal combustion engine;
    a first fuel filter in the fuel supply line downstream of the fuel tank;
    a fuel return line being connected in fluid communication to the fuel tank and being connectable in fluid communication to the internal combustion engine; and
    a control connected in fluid communication to and between the fuel supply line and the fuel return line, the control establishing a fluid communication connection between the fuel return line and the fuel supply line when fuel temperature in the fuel tank or fuel supply line is below a predeterminable threshold temperature providing a fuel flow from the fuel return line to the fuel supply line at a predeterminable threshold pressure in the fuel return line and blocking the fluid flow when the fuel temperature is above the threshold temperature, the control including a control housing having first and second ports connected in fluid communication by a fluid duct being in the control housing and forming a portion of the fuel supply line and including a thermostatic valve with a thermostatic element being arranged in a bottom of a recess in the control housing with most of a length of the thermostatic element extending through the bottom of the recess into the fluid duct, the thermostatic element controlling movement of a closing body of the thermostatic valve between open and closed positions of the fluid communication connection.

2. A delivery device according to claim 1 wherein
the control is in the fuel supply line upstream of the first fuel filter in a direction of fuel flow from the fuel tank to the internal combustion engine, and is connected to the fuel return line upstream of a counterbalance valve connected in fluid communication on an outlet side of the counterbalance valve to the fuel tank.

3. A delivery device according to claim 1 wherein
the thermostatic valve presets the threshold temperature; and
a pressure valve connected in fluid communication to the fuel return line presets the threshold pressure.

4. A delivery device according to claim 1 wherein
the fuel supply line and the fuel return line are connected in fluid communication to fuel injectors of a diesel internal combustion engine.

5. A delivery device according to claim 1 wherein
the fuel supply line comprises a delivery pump downstream of the first fuel filter and upstream of a second fuel filter in the fuel supply line.

6. A delivery device according to claim 1 wherein
the control housing comprises coaxially aligned first and second ports connected in fluid communication with the fuel supply line, the fluid duct extending along a longitudinal axis between the first and second ports, the length of the thermostatic element extending perpendicular to the longitudinal axis.

7. A control device for a fuel delivery device, the control device comprising:
    a housing with a continuous fluid duct extending between and connected in fluid communication between first and second ports connectable in a fuel supply line;
    a third port in the housing;
    a fluid connecting path extending between the third port and the fluid duct in the housing; and
    a thermostatic valve and a pressure valve in the fluid connecting path, the thermostatic valve establishing fluid communication between the third port and the fluid duct along the fluid connecting path when fluid in the fluid duct has a fluid temperature below a predeterminable threshold temperature at a predeterminable threshold pressure preset by the pressure valve and blocking the fluid connecting path when the fluid temperature is above the threshold temperature, the thermostatic valve having a thermostatic element in a bottom of a recess in the housing with most of a length of the thermostatic element extending through the bottom of the recess into the fluid duct and having a closing body moveable in the valve housing under control of the thermostatic element between an open position opening the fluid connecting path and a closed position blocking the fluid connecting path.

8. A control device according to claim 7 wherein
the closing body is biased by a spring to the open position and is moved to the closed position by expansion of the thermostatic element, and blocks the fluid connecting path between the pressure valve and the fluid duct.

9. A control device according to claim 7 wherein
the pressure valve is a spring loaded valve with a rolling diaphragm, opens at the threshold pressure at the third port and opens the fluid connecting path from the third port to the thermostatic valve that is located in the fluid connecting path.

10. A control device according to claim 8 wherein the closing body is a valve disk arranged between the spring and the thermostatic element.

11. A control device according to claim 7 wherein
the fluid connecting path extends perpendicular to a direction of the fluid duct between the first and second ports; and
the housing comprises first and second housing parts, the first housing part holding the thermostatic valve and having the fluid duct and the first and second ports therein, the second housing part holding the pressure valve and having the third port therein.

12. A control device according to claim 7 wherein
the first and second ports are connectable to a fuel supply line of a fuel delivery device; and
the third port is connectable to a fuel return line of the fuel delivery device.

13. A control device according to claim 7 wherein the housing is attached to a diesel fuel filter.

14. A control device according to claim 7 wherein
the length of the thermostatic element extends perpendicular to a length of the fluid duct extending between the first and second ports that are coaxially aligned.

\* \* \* \* \*